United States Patent [19]
Wright

[11] Patent Number: 5,109,314

[45] Date of Patent: Apr. 28, 1992

[54] SELECTIVELY REVERSIBLE VIDEO CASSETTE

[76] Inventor: Joey D. Wright, 1414 Washington, Blair, Nebr. 68008

[21] Appl. No.: 535,401

[22] Filed: Jun. 8, 1990

[51] Int. Cl.$^5$ .......................................... G11B 23/087
[52] U.S. Cl. .................................................. 360/132
[58] Field of Search ........................ 360/132; 242/199

[56]  References Cited

U.S. PATENT DOCUMENTS 4,482,104 11/1984 Saito .................................... 360/132

Primary Examiner—Robert S. Tupper
Attorney, Agent, or Firm—Zarley McKee Thomte Voorhees & Sease

[57]  ABSTRACT

A selectively reversible video cassette tape includes a housing with a supply reel and a take up reel rotatably mounted therein. A video tape is connected at one to the take up reel and at the other end to the supply reel and is operable therebetween. Apparatus is mounted within the housing to prevent counterclockwise rotation of the reels, yet permit clockwise rotation of the reels, to thereby prevent rewinding of the video tape. Apparatus is also provided which will selectively permit the rewinding of the video tape.

4 Claims, 5 Drawing Sheets

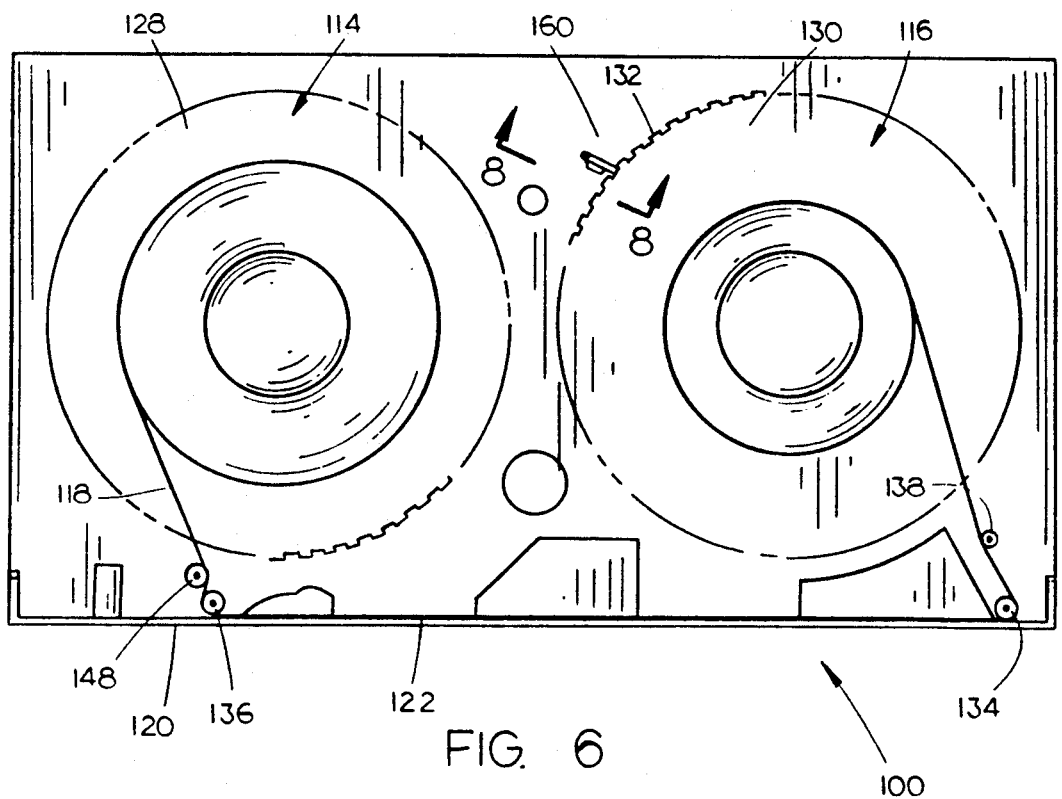
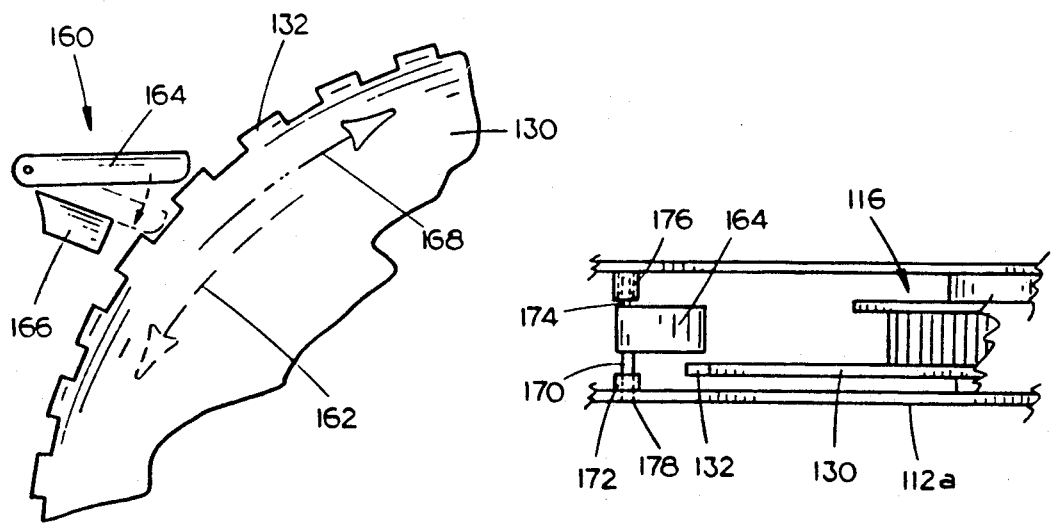

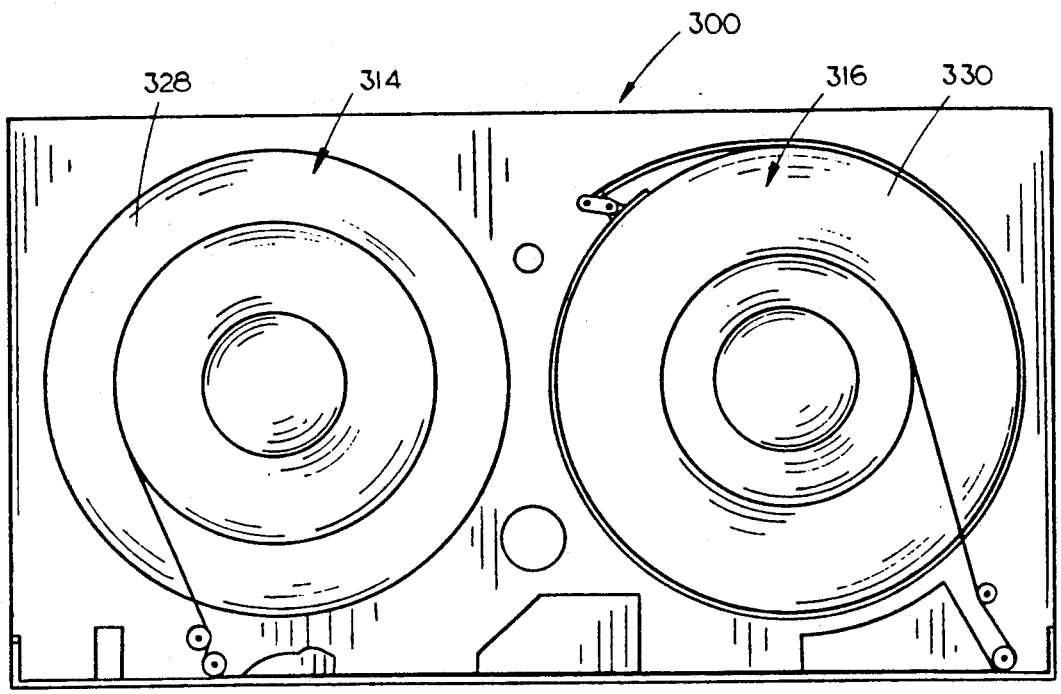
FIG. 13
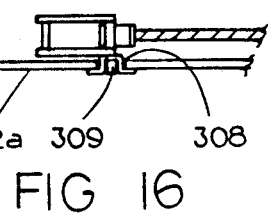
FIG 16
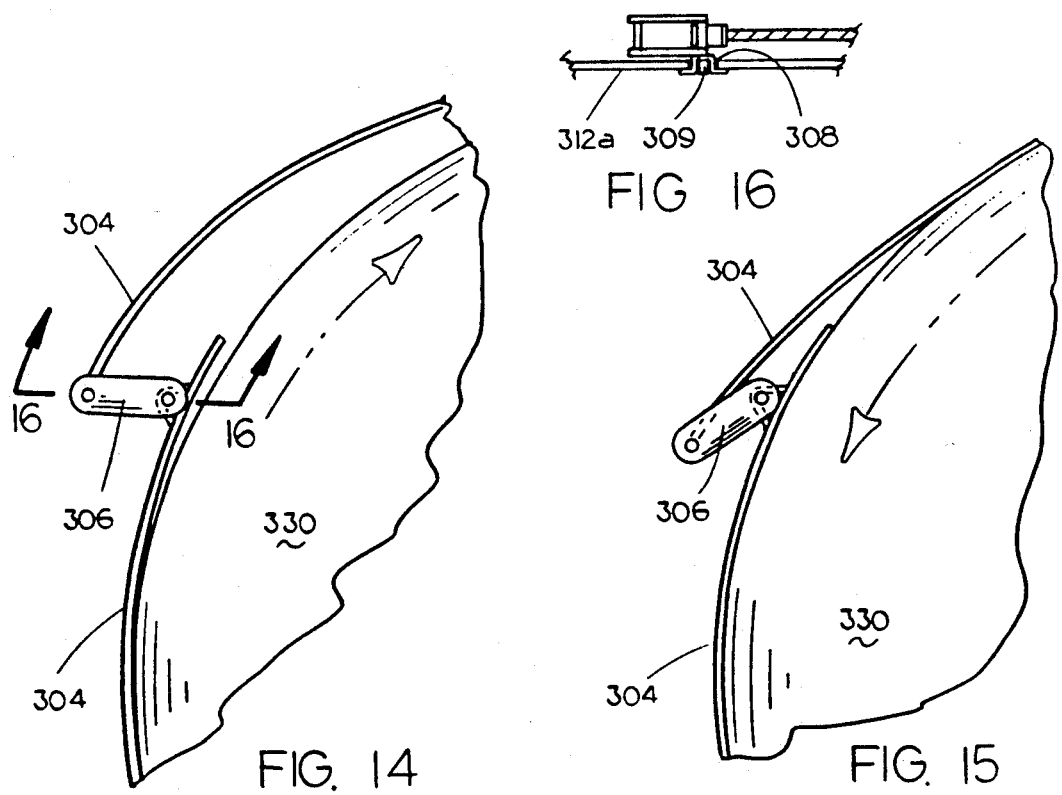
FIG. 14
FIG. 15

SELECTIVELY REVERSIBLE VIDEO CASSETTE

TECHNICAL FIELD

The present invention relates generally to video cassette tapes, and more particularly to a modified video cassette tape adapted for only selective reversing capabilities.

BACKGROUND OF THE INVENTION

Conventional video cassette tapes are designed to allow the audio visual material recorded on the tape to be viewed as often as desired. This occurs merely by rewinding the tape and replaying those portions as desired.

The video cassette rental industry has been burdened by the large number of tapes which must be acquired and stored for the renting public. In order to retain a wide selection of titles and a variety of subject matters, the video rental store must attempt to predict the number of renters who will desire to rent a given tape on a given date. If the rental store rents out its complete inventory of a single tape, it must turn away potential additional renters.

It is therefore an object of the present invention to provide a modified video cassette tape which may be viewed only once by a customer.

Another object of the present invention is to provide a selectively reversible video cassette tape which permits the rental store to rewind the tape for subsequent viewing or recording.

Yet another object of the present invention is to provide a tape which selectively prevents more than one viewing of the audio visual material recorded on the tape.

These and other objects will be apparent to those skilled in the art.

SUMMARY OF THE INVENTION

The selectively reversible video cassette tape of the present invention includes a housing with a supply reel and a take up reel rotatably mounted therein. A video tape is connected at one to the take up reel and at the other end to the supply reel and is operable therebetween. Apparatus is mounted within the housing to prevent counterclockwise rotation of the reels, yet permit clockwise rotation of the reels, to thereby prevent rewinding of the video tape. Apparatus is also provided which will selectively permit the rewinding of the video tape.

In one embodiment of the invention, a pawl is pivotally mounted adjacent one reel, and teeth project from the reel which will engage the pawl when the reel rotates in a counterclockwise direction, so as to prevent rewinding of the tape. The pawl is mounted such that a pin may be inserted through an aperture to raise the pawl and disengage it from the reel, to selectively permit counterclockwise rotation of the reels.

In a second embodiment of the invention, a gear is rotatably mounted within the housing which will engage the teeth on a reel. The gear is mounted on a shaft which is slidable within a slot parallel to a portion of the circumference of the reel. Rotation of the reel in a counterclockwise direction will slide the gear into a stop which will engage the gear and prevent further counterclockwise rotation of the reel. Clockwise rotation slides the gear to the opposite end of the slot and permits free rotation of the gear. The gear shaft has an aperture therein into which a pin may be journaled to prevent sliding of the gear shaft, and thereby selectively permit counterclockwise rotation of the reel.

A third embodiment of the invention includes an elongated band affixed at one end adjacent a reel and extending around the reel such that the ends overlap. A link is pivotally connected between the ends of the band. Counterclockwise rotation of the reel causes the band to tighten and to frictionally engage the reel to prevent further counterclockwise rotation. Clockwise rotation of the reel loosens the band and permits further clockwise rotation of the reel. The link has an aperture therein which will receive a special wrench which will prevent pivotal movement of the link, so as to selectively permit the band to maintain its loosened condition and permit counterclockwise rotation of the reel.

In a fourth embodiment of the invention, the video tape may be played and rewound, but a magnet is provided to erase the tape after it has been played and during the rewinding process.

BRIEF DESCRIPTION OF THE DRAWINGS

FIG. 6 is a top view of a second embodiment of the invention with the upper housing of the cassette removed to show the interior thereof;

FIG. 7 is an enlarged view of a portion of FIG. 6;

FIG. 8 is a sectional view taken at lines 8—8 in FIG. 6;

FIG. 13 is a top view of a fourth embodiment of the present invention with the upper cassette housing removed to show the interior thereof;

FIG. 14 is an enlarged view of a portion of FIG. 13;

FIG. 15 is a view similar to FIG. 14, showing a second position of the video cassette reel; and FIG. 16 is a sectional view taken at lines 16—16 in FIG. 14.

DESCRIPTION OF THE PREFERRED EMBODIMENTS

Figure 1:
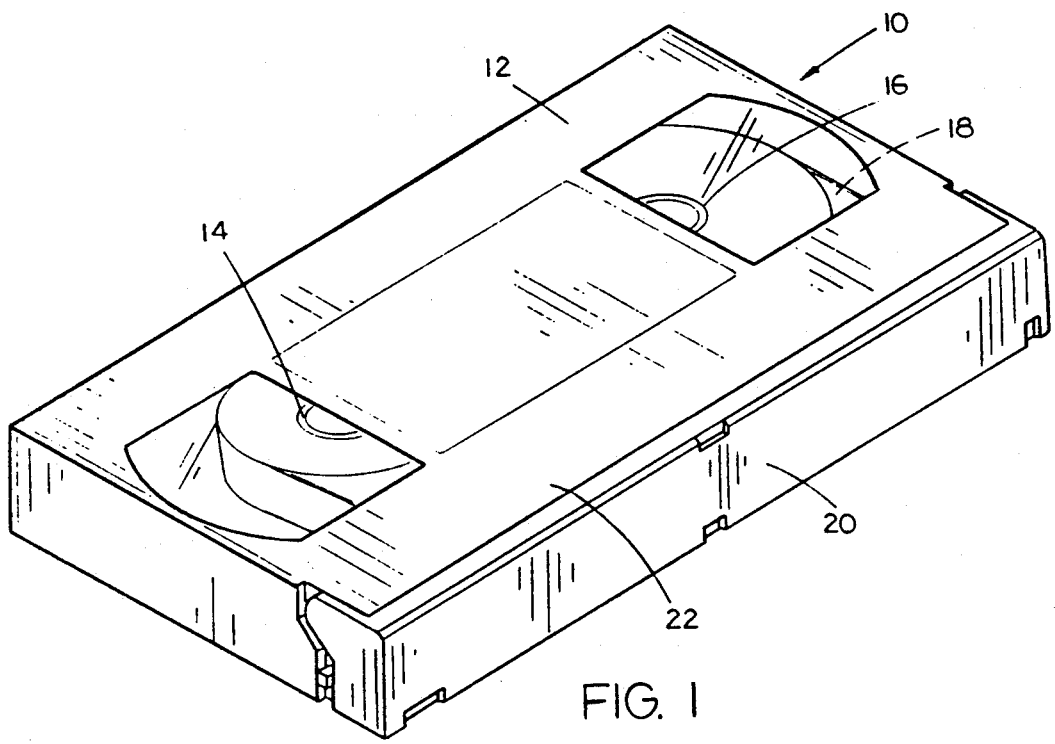
FIG. 1 is a perspective view of the video cassette tape of the present invention.

Referring now to the drawings, in which similar or corresponding parts are identified with the same reference numeral, and more particularly to FIG. 1, the video cassette tape of the present invention is designated generally at 10 and includes a housing 12 within which a pair of rotatable reels 14 and 16 are mounted for recording or playing tape 18.

A forward door 20 is pivotally mounted at each end to a forward edge 22 of housing 12. Door 20 is pivotal up and away from edge 22 to allow access to tape 18 once mounted within a video cassette player or the like.

Figure 2:
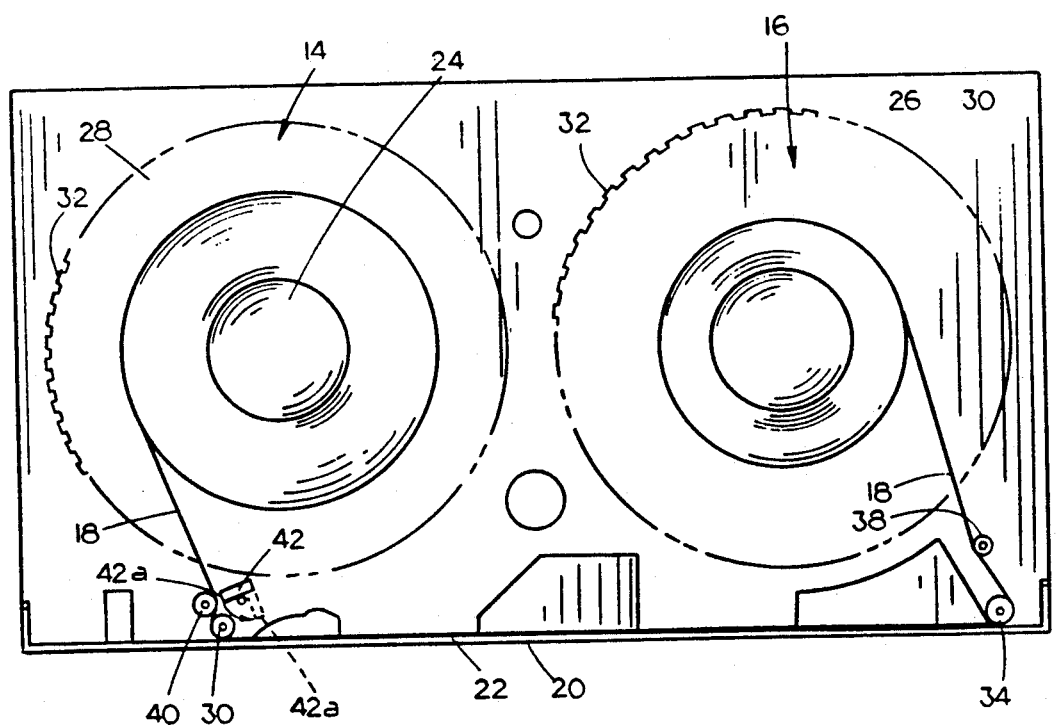
FIG. 2 is a top view of a video cassette tape of the present invention with the upper housing removed to reveal the interior of the tape.

Referring now to FIG. 2, reels 14 and 16 include reel hubs 24 and 26 respectively upon which tape 18 is wrapped or unwrapped upon rotation of the reels. Each reel 14 and 16 also includes a large diameter disk 28 and 30 respectively having a plurality of teeth 32 projecting around the circumference thereof and associated with a device which selectively locks the reels from rotation (not shown).

For purposes of description, reel 14 will be identified as the take up reel and reel 16 will be identified as the supply reel, such that movement of tape from reel 16 to reel 14 permits the audio visual material on tape 18 to be viewed or recorded, and movement of the tape from reel 14 to reel 16 occurs during rewinding of the tape.

A first guide roller 34 is rotatably mounted adjacent front edge 22 within housing 12 to guide tape 18 from supply reel 16 to an orientation parallel and adjacent forward edge 22. A second guide roller 36 is mounted adjacent forward edge 22 spaced apart from guide roller 34, such that tape 18 extends substantially entirely along the forward edge 22 of housing 12. Second guide roller 36 will direct tape 18 to take up reel 14 in a conventional fashion. A tensioner roller 38 is mounted between supply reel 16 and first guide roller 34, and a similar tensioner roller 40 is mounted immediately adjacent second guide roller 36. All of the above described elements are conventional components of prior art video cassette tapes. The inventor herein has modified this conventional cassette tape by operably mounting a bar magnet 42 within housing 12 adjacent tensioner roller 40. Bar magnet 42 is operable between the solid line position of FIG. 2, with edge 42a immediately adjacent tape 18 on roller 40, and the broken line position with forward edge 42a moved to a position spaced away from tape 18 and roller 40.

In those situations where recording equipment is available which can record audio-visual material onto videotape during the process of rewinding the tape, it would not be necessary to provide a movable magnet 42. Rather, magnet 42 could be permanently fixed in place. Similarly, guide roller 36 and/or tensioner roller 40 could be magnetized so as to erase videotape 18, so that no separate magnet 42 would be necessary.

Figure 3:
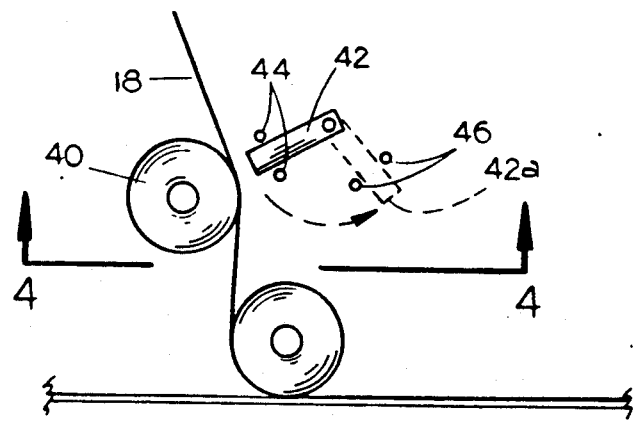
FIG. 3 is an enlarged view of a portion of FIG. 2.
Figure 4:
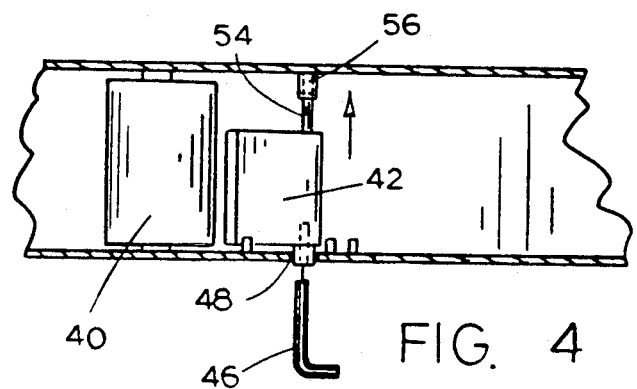
FIG. 4 is a sectional view taken at lines 4—4 in FIG. 3.
Figure 5:
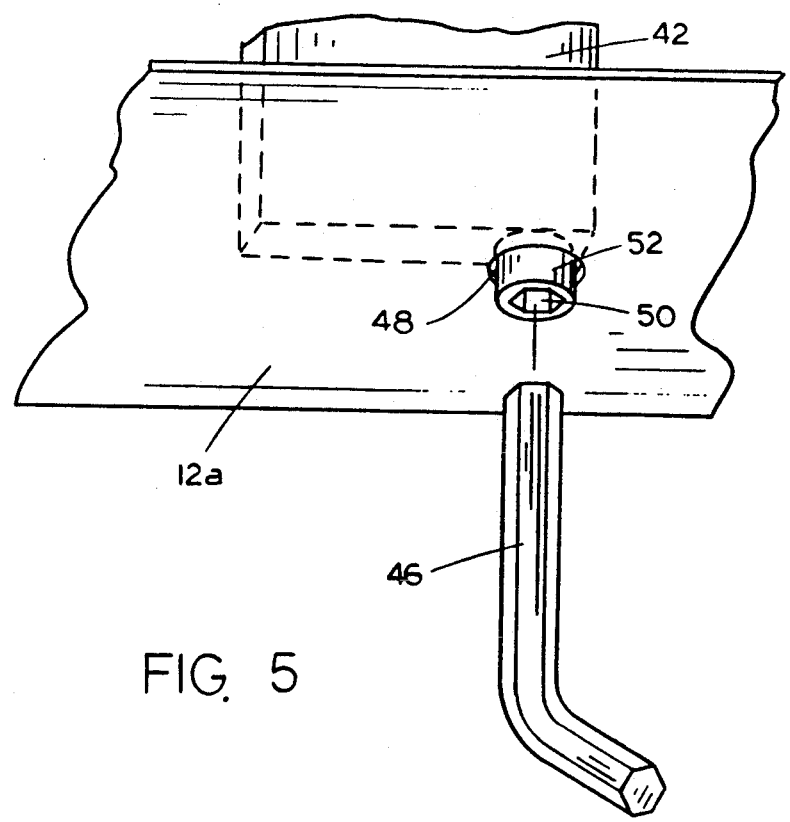
FIG. 5 is a pictorial view of the bottom portion of FIG. 4.

FIG. 3 is an enlarged view of a portion of FIG. 2 showing the bar magnet in more detail. FIG. 4 is a sectional view specifically showing bar magnet 42 and the adjacent roller 40. A pair of pins 44 project upwardly from the bottom of housing 12, which will retain bar magnet 42 in its position adjacent roller 40. A second pair of pins 46 project from the bottom of housing 12 and are positioned to retain bar magnet 42 in a position with forward edge 42a spaced away from tape 18. In order to move bar magnet 42 from the solid line position to the broken line position, a hexagonal tool 46 is inserted through an aperture 48 in the bottom 12a of housing 12 into a hexagonal aperture 50 in the leg 52 extending downwardly from bar magnet 42, as shown in FIG. 5. In this way, bar magnet 42 may be raised upwardly so that an upper pin 54 slides within a sleeve 56 to allow bar magnet 42 to move upwardly past pins 44. Bar magnet 42 may then be pivoted on leg 52 and pin 54 and lowered between the second pair of pins 46.

In operation, bar magnet 42 is pivoted to the broken line position shown in FIG. 3 utilizing a hexagonal tool 46 as described hereinabove. The desired audio visual material may then be freely recorded on tape 18 and rewound onto supply reel 16. The hexagonal tool is then utilized to move the bar magnet from the broken line position to the solid line position of FIG. 3 in proximity to tape 18 so as to erase any material thereon as the tape passes by bar magnet 42. In this way, once the tape has been viewed, it is automatically erased during the viewing period and is prepared for rerecording.

Referring now to FIGS. 6, 7 and 8, a second embodiment of the invention is designated generally at 100 and includes all of the components of a conventional video cassette tape. These components, as described above, include take up and supply reels 14 and 16, tape 18, a forward door 120 and forward edge 122 on a housing 112, disks 128 and 130 attached to reels 114 and 116, teeth 132 on disks 128 and 130, guide rollers 134 and 136, tensioner rollers 138 and 140, all operable in a conventional fashion. The second embodiment 100 differs from the first embodiment 10 in the use of a ratchet mechanism, designated generally at 160. Ratchet mechanism 160 prevents rotation of disk 130 in the counterclockwise direction (designated by broken arrow 162) by the pivoting movement of a pawl 164 against a stop 166 so as to catch a tooth 132 on disk 130. This is shown by the broken line position of pawl 164 in FIG. 7. Rotation of disk 130 in the clockwise direction, as shown by arrow 168 in FIG. 7, is not prevented, since movement of teeth 132 in the clockwise direction will pivot pawl 164 and allow the disk teeth 132 to slip by.

Pawl 164 has a lower leg 170 rotatably journaled within a sleeve 172 upon which hole 164 will pivot. An upper pin 174 projects from the top of pawl 164 into an upper sleeve 176 such that pawl 164 pivots between sleeves 172 and 176. An aperture 178 in the housing bottom 112a is coaxial with lower leg 170 such that a tool may be inserted in aperture 178 to raise pawl 164 above the teeth 132 of disk 130, to a position clear of teeth 132, as shown in FIG. 8. In this way, disk 130 and reel 116 are freely rotatable.

In operation, the cassette tape 100 is placed within a special recording apparatus to record the desired audio visual material. The recording apparatus has a pin which will be inserted through aperture 178 so as to push pawl 164 upwardly out of engagement with teeth 132. Thus, the video tape may be rewound after the recording operation. The video tape may then be rented to a consumer who can view the tape, since supply reel 116 will rotate in a clockwise direction during play of the video tape. However, the consumer will not be able to rewind the tape so as to play it again, due to the action of ratchet mechanism 160.

Figure 9:
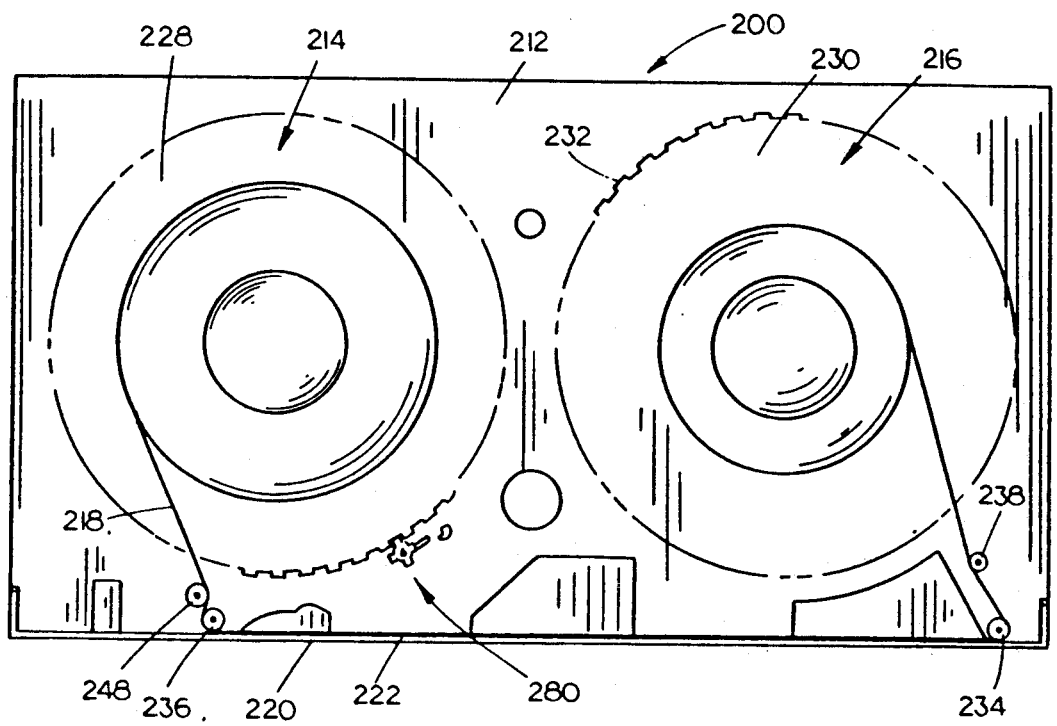
FIG. 9 is a third embodiment of the present invention with the upper casing of the video tape removed to show the interior thereof.
Figure 12:
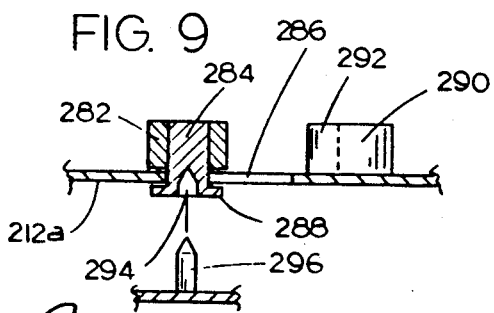
FIG. 12 is a sectional view taken at lines 12—12 in FIG. 10.
Figures 10, 11:
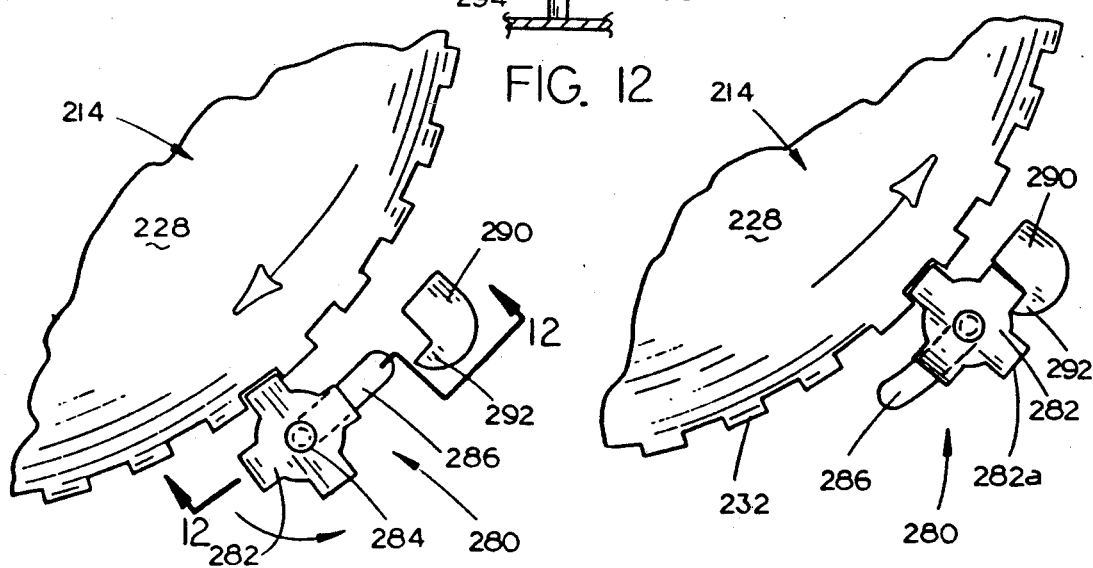
FIG. 10 is an enlarged view of a portion of FIG. 9.
FIG. 11 is a view similar to FIG. 10, showing a second position of a video tape reel.

Referring now to FIGS. 9-11, a third embodiment of the invention is disclosed, which has all the basic features of the first embodiment 10. These features include a housing 212, reels 214 and 216, video tape 218, a forward door 220 pivotally mounted to a forward housing edge 222, a pair of disks 228 and 230 mounted on reels 214 and 216 respectively, teeth 232 on disks 228 and 230, guide rollers 234 and 236, and tensioner rollers 238 and 240. A selective locking mechanism is designated generally at 280 and is operably mounted adjacent tape up reel 214, as shown in the figures.

Selective locking mechanism 280 includes a gear 282 mounted on a shaft 284, the shaft projecting through an elongated slot 286 such that gear 282 is slidable and rotatable. An annular flange 288 retains shaft and gear 284 and 282 in rotatable slidable position on the housing bottom 212a. A small projecting stop 290 is mounted adjacent one end of slot 286, and has a projecting hookshaped lip 292 designed to correspond with the teeth 282a of gear 282, as shown in FIG. 11.

A longitudinal aperture 294 is formed in the bottom of shaft 284 and is designed to receive a corresponding pin 296 so as to prevent slidable movement of gear 282 along slot 286. In operation, a prerecorded tape is leased or rented to a consumer who will place it in their video cassette player so as to view the tape. The tape may be played, since reel 214 will rotate in a clockwise direction (as shown in FIG. 10) and gear 282 will freely rotate at one end of slot 286. However, if the consumer attempts to rewind the tape, take up reel 214 will rotate in a counterclockwise direction, such that disk 228 will rotate in a counterclockwise direction sliding gear 282 along slot 286 and into journaled position with stop 290. In this position, gear 282 will be prevented from rotating, and will journal within teeth 232 of disk 228 to prevent counterclockwise rotation of reel 214. In order to be permitted to rewind the tape, and thereby reuse the tape, the video cassette recorder must have a special feature with a pin 296 to retain gear 282 in a rotatable position spaced from stop 290.

Referring now to FIGS. 13-16, a fourth embodiment of the invention is designated generally at 300 and includes all of the standard components of the first embodiment of video cassette tape 10, except for teeth on disks 28 and 330, as will be described in more detail hereinbelow. The fourth embodiment of video cassette tape 300 includes a selective locking mechanism designated generally at 302 which will selectively allow rotation of disk 330 in the clockwise direction, and prevent rotation in the counterclockwise direction. Locking mechanism 302 includes a flexible band 304 extending completely around disk 330 and having a pivotal link 306 pivotally connected to each end of band 304. One end of link 306 has a shaft 308 projecting downwardly therefrom through an aperture in the bottom 312a of housing 312, to serve as a pivotal axis for link 306. Shaft 308 has a hexagonal aperture 309 therein adapted to receive a hexagonal wrench or the like to allow selective pivoting of link 306.

In operation, the playing of a video tape will cause disk 330 to rotate in a clockwise direction, as shown in FIG. 14, the rotational movement pivoting link 306 so as to loosen band 304 around disk 330. However, rotation of disk 330 in a counterclockwise direction will frictionally engage band 304 pivoting link 306 to a position generally tangent to disk 330, as shown in FIG. 15. This is turn causes band 304 to tighten around disk 330 and prevent further rotational movement. In order to prevent tightening of band 304 on disk 330, it is necessary to utilize a piece of recording equipment having a hexagonal tool adapted to fit hexagonal aperture 309, the tool being rotated to maintain link 306 in the position shown in FIG. 14, thereby maintaining loop 304 in a loosened condition.

Whereas the invention has been shown and described in connection with the preferred embodiments thereof, it will be understood that many modifications, substitutions and additions may be made which are within the intended broad scope of the appended claims. There has, therefore, been shown and described a modified video cassette tape which accomplishes at least all of the above-stated objects.

I claim:

1. A selectively reversible video cassette tape, comprising:
   a hollow housing;
   a take up reel and a supply reel operably mounted in said housing;
   video tape connected at one end to said take up reel and connected at the other end to said supply reel;
   means in said housing operable between an engaged position permitting clockwise rotation of said reels and preventing counterclockwise rotation of said reels, and a released position permitting counterclockwise rotation of said reels, including:
   said supply reel having a lower disk with a plurality of teeth around the circumference thereof;
   a gear rotatably mounted on a shaft, said gear in engagement with said teeth to rotate on said shaft when said disk rotates;
   said shaft being slidably and rotatably mounted through a slot formed in said housing, the slot having first and second ends and extending generally parallel to a portion of the circumference of said disk;
   stop means mounted at the second end of said slot to prevent rotation of said gear when engaged with said stop means;
   said slot located such that clockwise rotation of the disk will slide said gear shaft to the first end of the slot so as to freely rotate, and such that counterclockwise rotation of the disk will slide said gear shaft to the second end of the slot so as to engage the gear with said stop means and prevent rotation of the disk; and
   means for selectively preventing the engagement of said gear with said stop means.

2. The cassette tape of claim 1, wherein said means for preventing engagement includes:
   said shaft having an aperture in a lower end thereof; and
   a pin selectively engagable with said aperture to prevent slidably movement of the shaft within said slot.

3. A selectively reversible video cassette tape, comprising:
   a hollow housing;
   a take up reel and a supply reel operably mounted in said housing;
   video tape connected at one end to said take up reel and connected at the other end to said supply reel;
   means in said housing operable between an engaged position permitting clockwise rotation of said reels and preventing counterclockwise rotation of said reels, and a released position permitting counterclockwise rotation of said reels, including;
   said supply reel having a lower disk with a plurality of teeth around the circumference thereof;
   a pawl pivotally mounted adjacent said disk such that one end thereof contacts said teeth and is pivoted counterclockwise out of engagement with the teeth by clockwise rotation of said disk, and which is pivoted clockwise into engagement with the teeth upon counterclockwise rotation of the disk;
   a pawl stop mounted adjacent said pawl to prevent clockwise pivotal movement of said pawl when in engaged with said teeth; and
   means for selectively preventing the engagement of said pawl with said teeth;
   said means for preventing engagement including:
   said pawl being mounted on a rotatable shaft extending between an upper and lower sleeve and vertically movable within said sleeves: and an aperture in said lower sleeve permitting access to said shaft from outside said housing to slide said shaft upwardly within said sleeves;

whereby said shaft may be raised within said sleeves to disengage said pawl from said disk by inserting a pin through said aperture.

4. A selectively reversible video cassette tape, comprising:

a hollow housing;

a take up reel and a supply reel operably mounted in said housing;

video tape connected at one end to said take up reel and connected at the other end to said supply reel;

means in said housing operable between an engaged position permitting clockwise rotation of said reels and preventing counterclockwise rotation of said reels, and a released position permitting counterclockwise rotation of said reels, including:

said supply reel having a disk thereon for rotation therewith;

an elongated band having a first fixed end and a second free end, said band extending from said first end around the circumference of said disk to form a loop, with the second end overlapping the first end;

a link having first and second ends, the first end pivotally connected to the first end of said band, and the second end pivotally connected to the second end of said band;

said band being formed of a material and located so as to frictionally engage said disk and cause said link to pivot and tighten the loop formed around the disk when said disk rotates in a counterclockwise direction, to prevent further counterclockwise rotation of the disk, and to pivot said link to loosen the loop around the disk when said disk rotates in a clockwise direction, to permit clockwise rotation of the disk; and means for selectively preventing pivotal movement of said link.

* * * * *